United States Patent
Hsu (10) Patent No.: US 11,519,548 B2
(45) Date of Patent: Dec. 6, 2022

(54) QUICK-RELEASE STRUCTURE FOR A DISPLAY

(71) Applicant: Jarllytec Co., Ltd., New Taipei (TW)

(72) Inventor: Yu-Tsun Hsu, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 225 days.

(21) Appl. No.: 16/952,582

(22) Filed: Nov. 19, 2020

(65) Prior Publication Data

US 2022/0003355 A1    Jan. 6, 2022

(30) Foreign Application Priority Data

Jul. 1, 2020    (TW) ................................. 109122279

(51) Int. Cl.
  *F16M 11/04*    (2006.01)
  *F16M 11/10*    (2006.01)
  *G06F 1/18*    (2006.01)

(52) U.S. Cl.
  CPC ......... *F16M 11/041* (2013.01); *F16M 11/105* (2013.01); *G06F 1/181* (2013.01); *F16M 2200/024* (2013.01)

(58) Field of Classification Search
  None
  See application file for complete search history.

(56) References Cited

U.S. PATENT DOCUMENTS

| 6,443,408 B1* | 9/2002 | Hung | F16M 11/2021 |
| | | | 248/176.1 |
| 2009/0020672 A1* | 1/2009 | Lai | F16M 11/10 |
| | | | 248/274.1 |
| 2018/0032104 A1* | 2/2018 | Schatz | G06F 1/1683 |
| 2019/0327841 A1* | 10/2019 | Li | F16M 11/105 |
| 2019/0357368 A1* | 11/2019 | Huang | F16M 11/105 |
| 2020/0158278 A1* | 5/2020 | Daugirdas | A61B 6/4405 |

FOREIGN PATENT DOCUMENTS

| CN | 201036450 Y | 3/2008 |
| CN | 103388729 A | 11/2013 |
| CN | 210567151 U | 5/2020 |

* cited by examiner

*Primary Examiner* — Xanthia C Cunningham
(74) *Attorney, Agent, or Firm* — Muncy, Geissler, Olds & Lowe, P.C.

(57) ABSTRACT

The present invention provides a quick-release structure for a display, comprising a stand, a first buckle ring and a second buckle ring. The stand includes a top base, and the top base is connected with a side of a top end of a support frame, where the top base has a front cover and a rear cover that cover oppositely each other. A clamping space is provided between the front cover and the rear cover, and the front cover has an outer periphery having a plurality of notches. The first buckle ring, accommodated and limited in the clamping space in a manner that the first buckle ring can be restored after being rotated, where the first buckle ring is provided with a pushing portion passed through the first limiting hole to push the first buckle ring to be rotated.

14 Claims, 8 Drawing Sheets

QUICK-RELEASE STRUCTURE FOR A DISPLAY

FIELD OF THE INVENTION

The present invention is related to a quick-release structure for a display, and more particularly to a quick-release structure for quickly assembling and disassembling a stand and a display.

BACKGROUND OF THE INVENTION

For an all-in-one computer (AIO, All-in-One) a host is mainly provided on a display, and then the display is combined with the top of a stand through a locking structure provided on the back of the display. In this way, the display is supported by the stand, so that the display can be used on the desktop or flat surface. In this way the connection of the display with the stand through the locking structure makes it very inconvenient and more time-consuming to proceed the assembling and the disassembling.

For example, the Chinese Utility Model Patent entitled with "A screen support structure for easy assembling and disassembling" with No. CN103388729 has disclosed a feasible solution, which includes a stand and a coupling frame. The coupling frame is pivotally connected with the stand, and the coupling frame includes a fixing part and a buckle plate that is connected with the fixing part and can be moved elastically relative to the fixing part. The buckle plate is provided with a buckle part, and the fixed part is provided with a positioning part. When the stand is to be assembled and combined with a screen, the positioning part of the fixing member is first inserted into the positioning part on the back of the screen, and then the buckle part on the buckle plate is pressed into a joint part buckled on the screen to complete the assembling, such that the stand and the screen can be easily and quickly assembled or disassembled. Moreover, referring to the structures disclosed in the Chinese Patent entitled with "Racks with quick loading and unloading function" with No. CN201036450Y and in the Chinese Patent entitled with "Vertical Lifting Device" with No. CN210567151U, they are different from that in the Chinese Utility Model Patent with No. CN103388729, while they all have the function of quickly assembling or disassembling the stand and screen.

SUMMARY OF THE INVENTION

By means of the structure of the above-mentioned patent with No. CN103388729, it is indeed possible to quickly complete the assembling of the coupling frame and the display, but too many components are required in this patent, which is not conducive to cost reduction. In terms of rotational positioning, the positioning structure of "pin or steel ball plus spring" used in the CN201036450Y requires precise manufacturing and positioning. Any error would easily cause the display to shake and tilt. Furthermore, the three patents with No. CN103388729, No. CN201036450Y and No. CN210567151U all have the buckle arranged on the circumferential side, which is not only abrupt but also easy to cause damage to the devices of these patents or bring injury to users. Accordingly, in order to improve above technical problems, the present invention is provided.

One object of the present invention is to provide a quick-release structure for a display, which can overcome the problem that too many small components are required in patent with NO. CN103388729, that is, which can effectively decrease the number of required components to reduce production costs. Furthermore, in the present invention, the "first buckling portion" and the "second buckling portion" are provided at corresponding positions to facilitate the corresponding hooking, and the "first buckling portion" and the "pushing portion" are combined to facilitate simultaneous action, such that the quick-release structure of the present invention can be rotated synchronously with the display and the stress can be shared. Moreover, the "first buckling portion" is stored in the "housing of the top base of the stand". Different from the conventional three patents of No. CN103388729, No. CN201036450Y and No. CN210567151U, where the buckle is arranged on the circumferential side, the arrangement of the buckle arranged on the circumferential side can make it more convenient to proceed the assembling and disassembling of the present invention, and also can protect the "first buckle portion" "and "second buckle portion" to avoid damage caused easily and abruptly to the devices of the present invention or brought injury to users.

One object of the present invention is to provide a quick-release structure for a display, so as to improve the positioning structure of the "pin or steel ball plus spring" with No. CN201036450Y, which requires precise manufacturing and positioning. Any error would be easy to cause the display shaking and tilting. In the positioning structure, the assembling and positioning are carried out by means of the "several magnetic parts" that form a multi-point mutual positioning via attraction, which is helpful for the rapid attractive positioning via attraction and corresponding hooking, and can also prevent the display from falling off in the unlocking process. There are also grooves and protrusions provided on the corresponding round surface to help confirmation for the positioning. On the other hand, in terms of rotational positioning, the conventional positioning structure can be replaced with "two stoppers", so as to stop the display when it is rotated vertically or horizontally and to avoid the tilting of the display.

In order to fulfill above objects, a quick-release structure for a display of the present invention comprises a stand, a first buckle ring and a second buckle ring. The stand includes a top base and a support frame, the top base is connected with a side of a top end of the support frame, where the top base has a front cover and a rear cover that cover oppositely each other. A clamping space is provided between the front cover and the rear cover, and the front cover has an outer periphery having a plurality of notches, and the rear cover has one side having a first limiting hole. The plurality of notches and the first limiting hole are respectively in communication with the clamping space. The first buckle ring, accommodated and limited in the clamping space in a manner that the first buckle ring can be restored after being rotated, where the first buckle ring has one side provided with a pushing portion, and the pushing portion is passed through the first limiting hole and protruded to be outside the top base, so as to push the first buckle ring to be rotated. The first buckle ring has one lateral surface having a plurality of first buckle portions. The second buckle ring, connected with a back-lateral surface of a display, where the second buckle ring has a plurality of second buckle portions for being inserted into the plurality of notches of the front cover and respectively buckling the plurality of first buckle portions.

In implementation, the top base further includes an adapter assembly and a linkage member, the adapter assembly is connected with the side of the top end of the support frame, and the adapter assembly has a first stop portion and a second stop portion, and the linkage member is connected with the top base and clamped between the front cover and the rear cover; the linkage member has a pressing portion for be pressed against the first stop portion or the second stop portion after the linkage member is rotated synchronously with the top base and the display, so as to enable the display positioned in a vertical or horizontal position.

In implementation, the adapter is connected with the side of the top end of the support frame, and the connection component has a stop ring, and the stop ring has the first stop portion and the second stop portion.

In implementation, the adapter assembly further includes a hinge module, and the hinge module is respectively connected with the connection component and the adapter for driving the display to be tilted upward and rotated.

In implementation, the connection component further includes a fixed plate set and a limiting plate set, and the fixed plate set is connected with the hinge module, the fixed plate set, and the limiting plate set are clamped and connected with the stop ring, and the linkage member is clamped rotatably between the fixed plate set and the limiting plate group.

In implementation, the stop ring has an outer periphery provided with a curved groove, and the curved groove has two sides respectively forming the first stop portion and the second stop portion. The linkage member is an annular plate, and the linkage member has an inner annular surface having the pressing portion protruding radially for being pressed against the first stop portion or the second stop portion.

In implementation, the first buckle ring includes a ring-shaped buckle plate and a plurality of elastic members, and the ring-shaped buckle plate has a plurality of first limiting portions arranged in a form of an annular array for respectively limiting one end of each elastic member. A plurality of second limiting portions arranged in a form of an annular array is provided on one lateral surface of the front cover for limiting another end of each elastic member respectively.

In implementation, the ring-shaped buckle plate has one lateral surface provided with a plurality of first curved grooves arranged in a form of an annular array, each first curved groove has one end forming the first limiting portion, and the front cover has one lateral surface provided with a plurality of second curved grooves arranged in a form of an annular array, each second curved groove has one end forming the second limiting portion.

In implementation, the front cover has one lateral surface provided with a plurality of first positioning grooves for accommodating and positioning a plurality of first magnetic members. A plurality of second magnetic members are further provided between one side of the second buckle ring and the rear side of the display for correspondingly attracting the plurality of first magnetic members, and the rear side of the display is further provided with a plurality of second positioning grooves for accommodating and positioning the plurality of second magnetic members respectively.

In implementation, each first positioning groove is a sectional round hole formed on one lateral surface of the front cover. After the first magnetic member is accommodated in the sectional round hole, the first magnetic member is fixed and positioned on one lateral surface of the front cover with a baffle.

In implementation, the front cover further has another lateral surface provided with a first engaging portion, and an engaging plate is further provided between one side of the second buckling ring and the plurality of second magnetic members, and the engaging plate has a second engaging portion for engaging and positioning the first engaging portion.

In implementation, the first engaging portion includes a first protruding portion and two second protruding portions respectively extending outwardly from opposite ends of the first protruding portion; the second engaging portion includes a first perforation and two second perforations respectively extending outwardly from opposite ends of the first perforation.

The present invention will be understood more fully by reference to the detailed description of the drawings and the preferred embodiments below.

DETAILED DESCRIPTIONS OF PREFERRED EMBODIMENTS

The quick-release structure for a display provided by the present invention includes a stand. The stand has a top base connected with a side of a top end of a support frame, and the top base has a front cover and a rear cover that cover oppositely each other. The front cover has an outer periphery having a plurality of notches, and the rear cover has one side having a first limiting hole. There is a clamping space between the front cover and the rear cover, and the clamping space accommodates and limits a first buckling ring. The first buckle ring can be actuated by the elastic member to be rotated and then be restored in the clamping space. The first buckle ring has a pushing portion passed through the first limiting hole, such that after the pushing portion is pushed, the first buckle ring is rotated. The first buckle ring further has a plurality of first buckle portions. A second buckle ring is connected with a rear lateral surface of the display. The second buckle ring has a plurality of second buckle portions. After the plurality of second buckle portions are respectively inserted into the plurality of notches of the front cover, the plurality of second buckle portions are correspondingly buckled to the plurality of first buckling portions of the first buckle ring, such that the display and the second buckle ring are connected with or separated from the top base and the first buckle ring.

Figure 1:
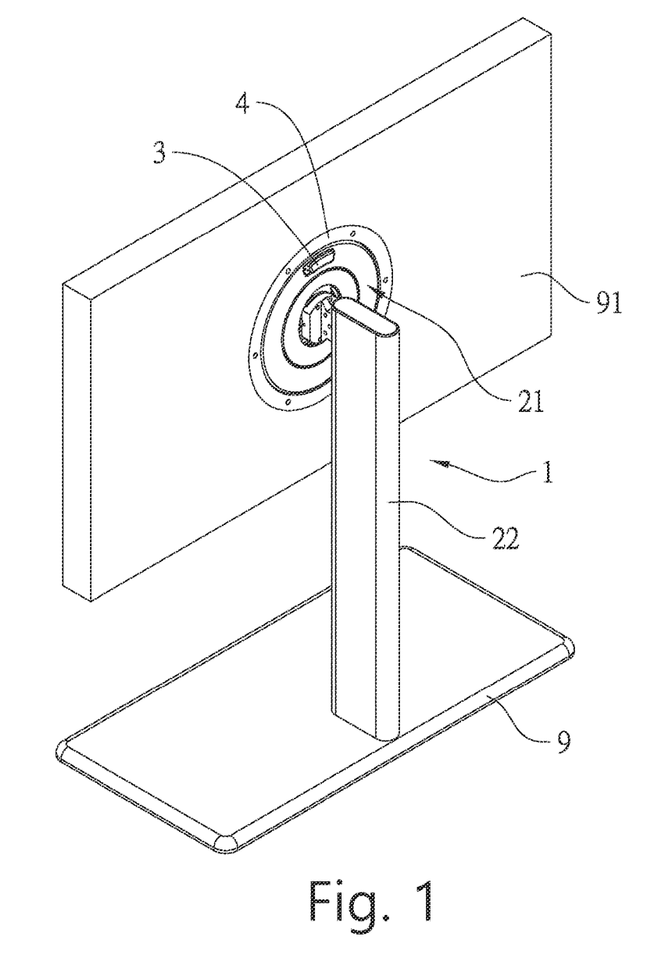
FIG. 1 is a schematic view showing the three-dimensional appearance of the preferred embodiment of the present invention when being combined with a display and a base.
Figure 2:
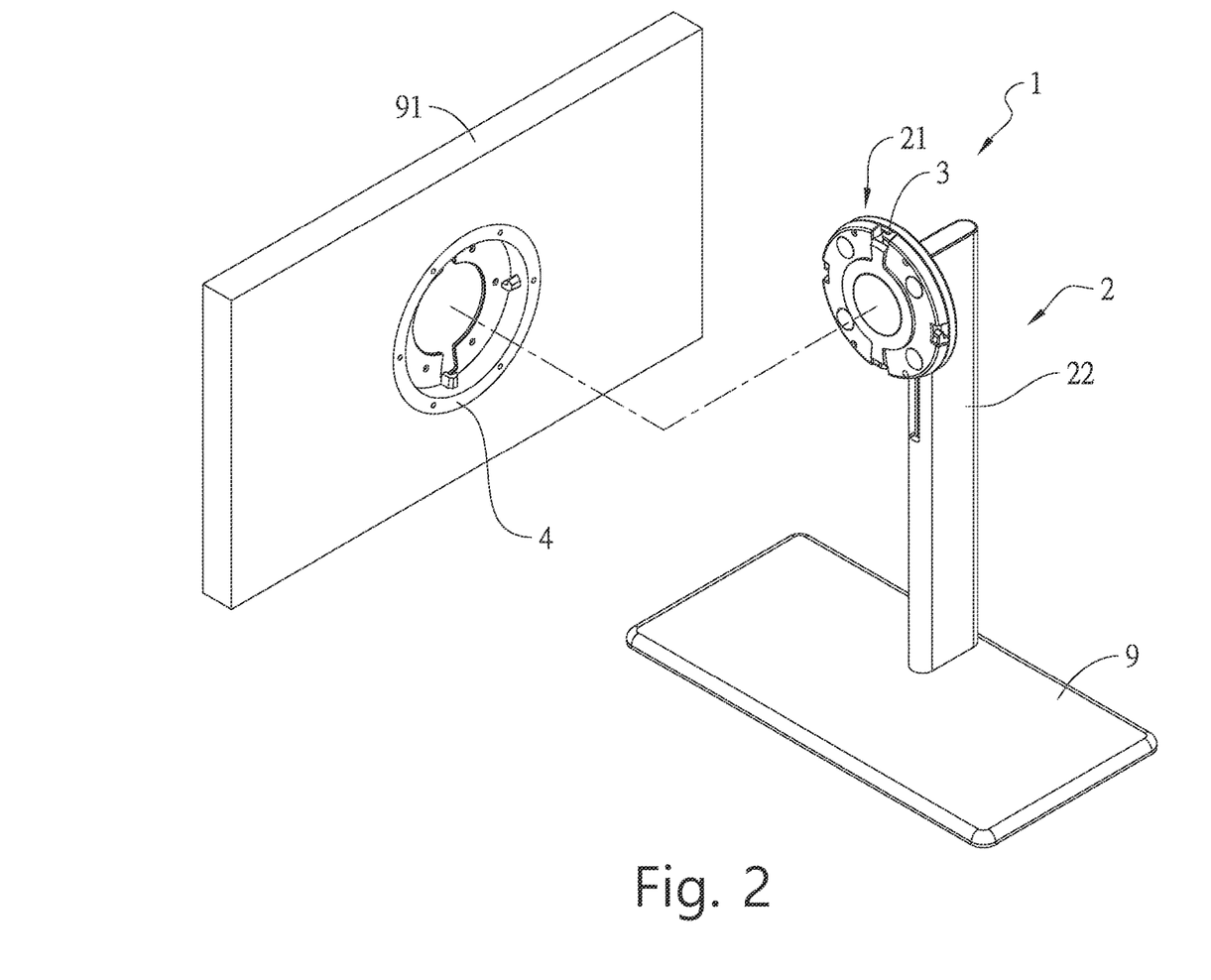
FIG. 2 is a schematic view showing the three-dimensional appearance of the preferred embodiment of the present invention when being separated from the display.
Figure 3:
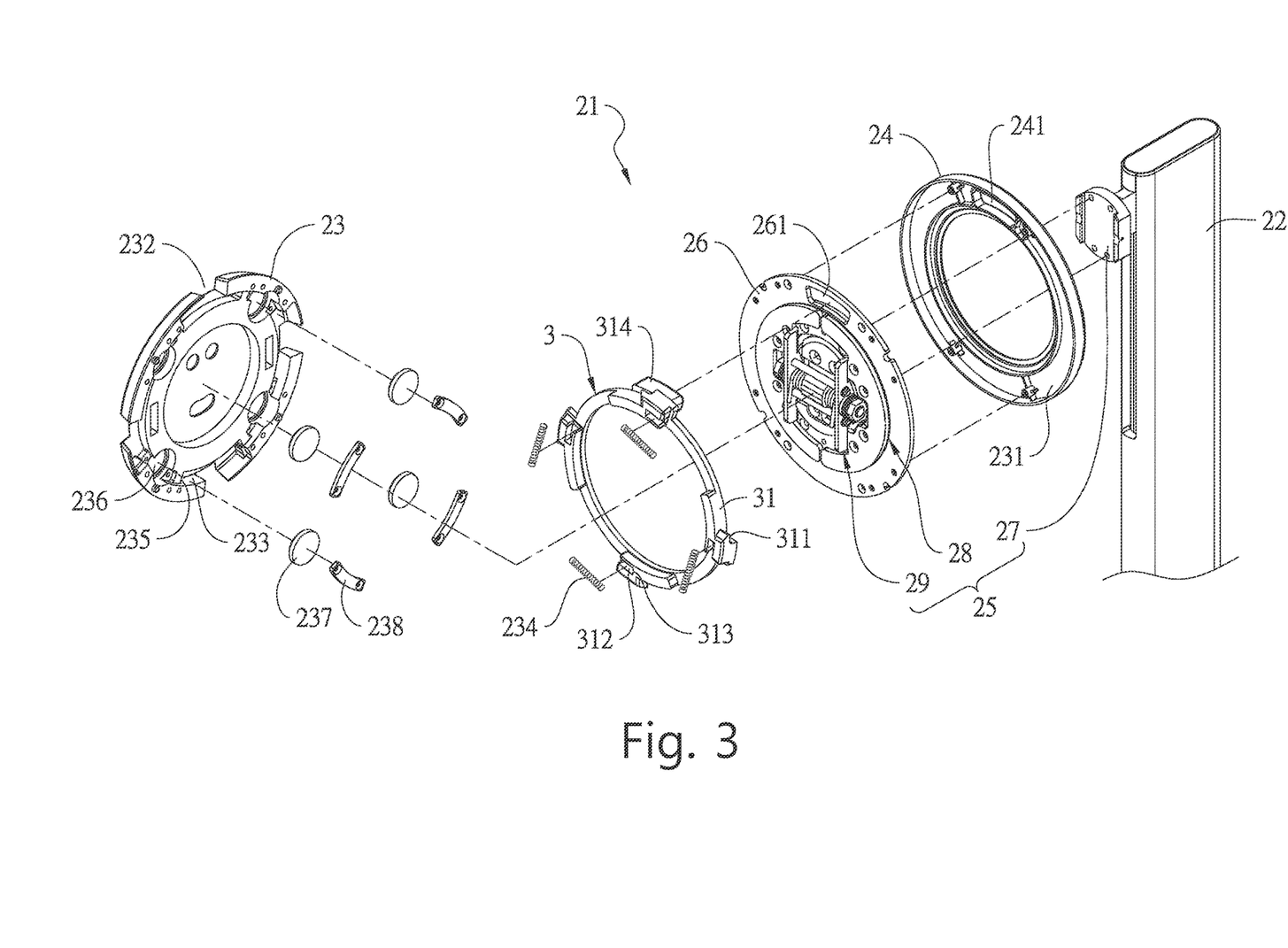
FIG. 3 is an exploded view showing the top base, the linkage member and the stand of the preferred embodiment of the present invention.
Figure 4:
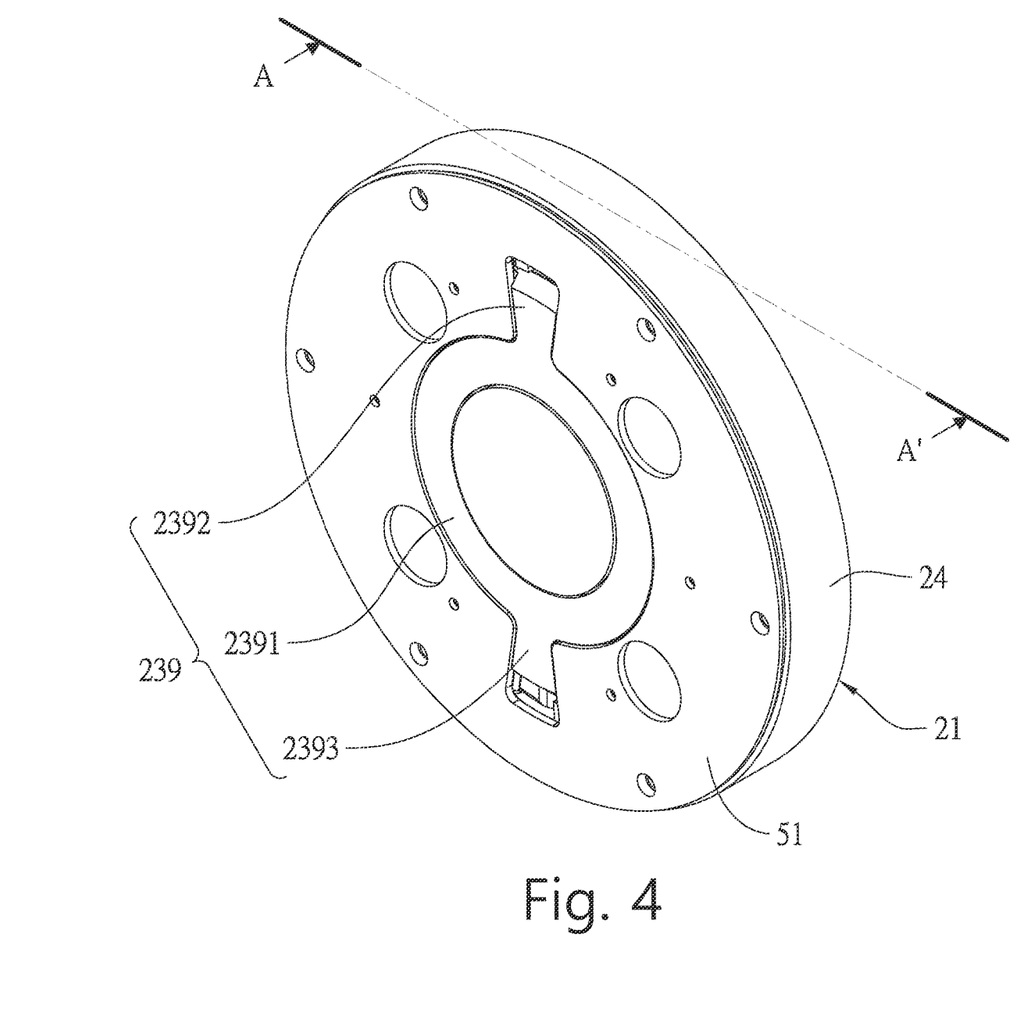
FIG. 4 is a schematic view showing the three-dimensional appearance of the top base, the second buckle ring and the positioning plate of the preferred embodiment of the present invention.
Figure 5:
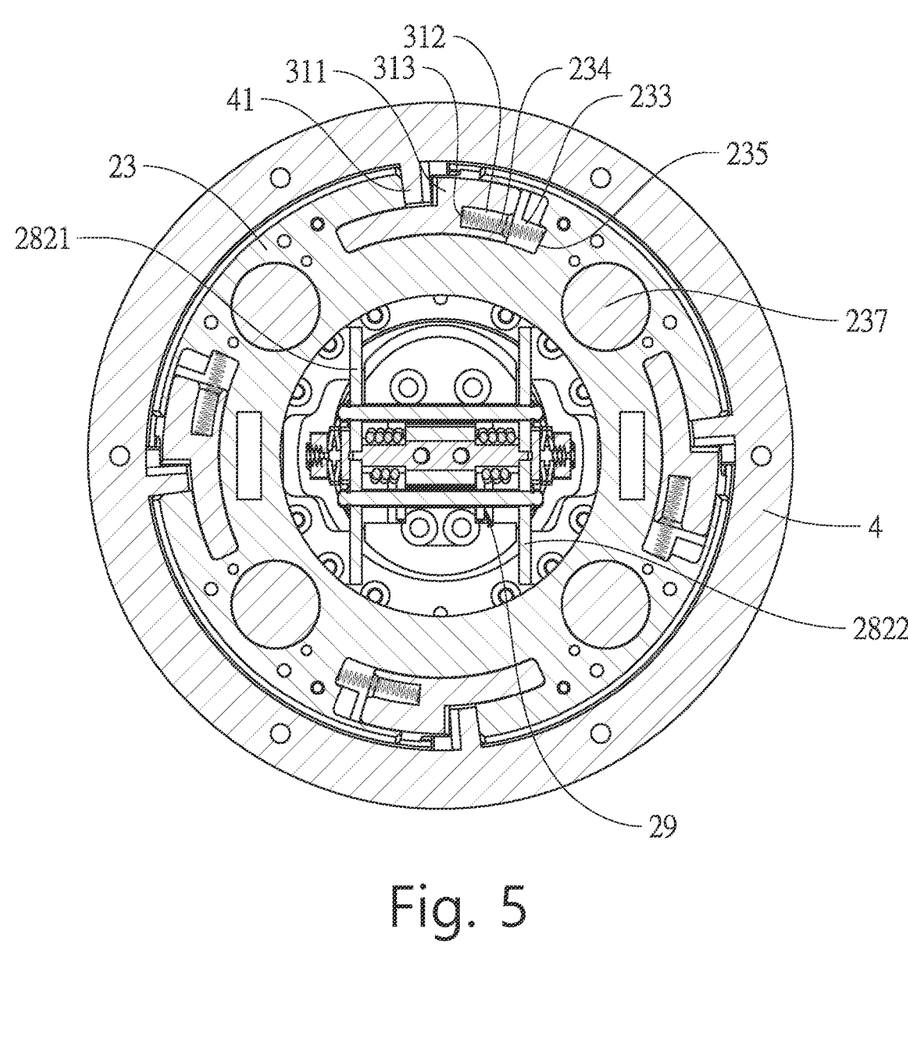
FIG. 5 is a cross-sectional view taken along A-A' line in FIG. 4.
Figure 6:
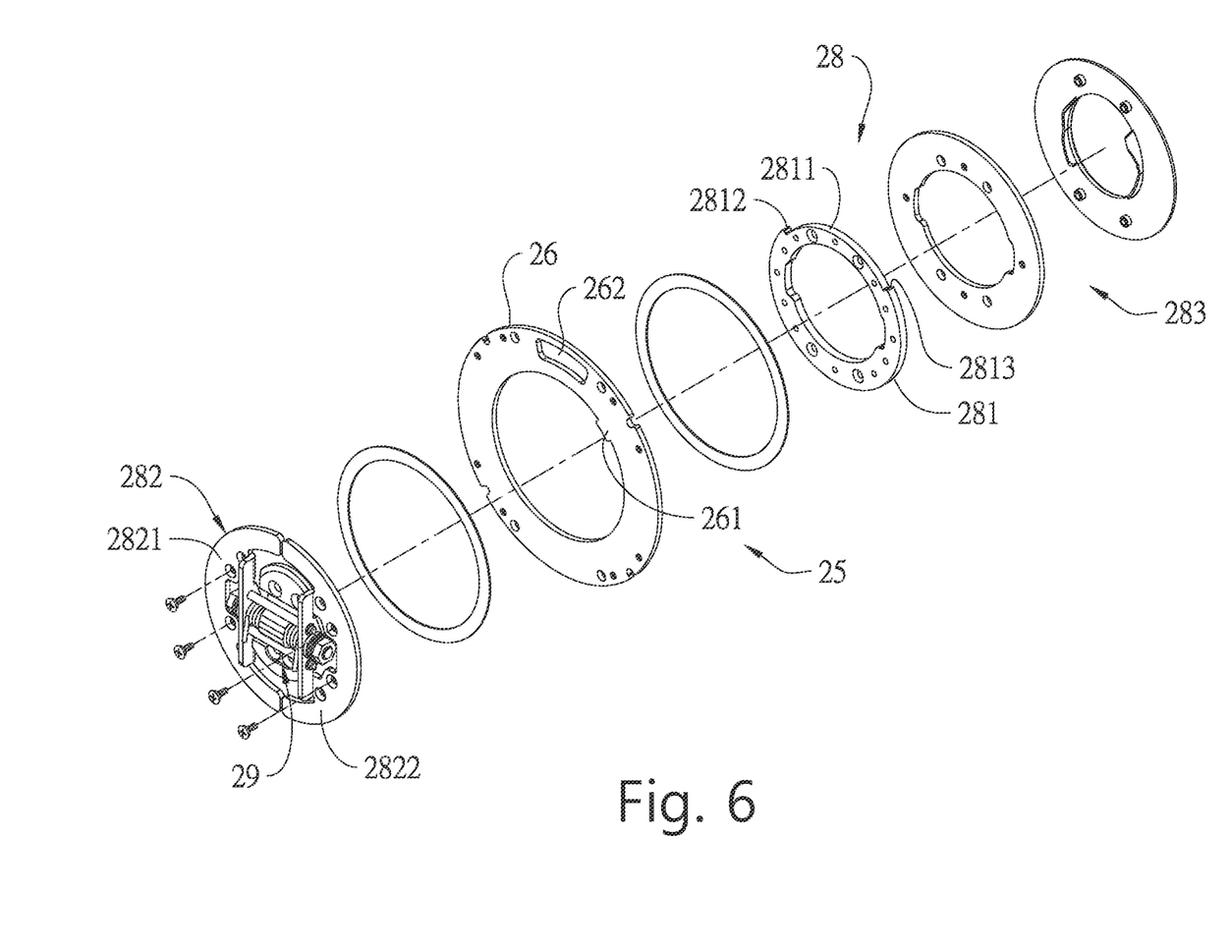
FIG. 6 is an exploded view showing the adapter assembly and the linkage member of the preferred embodiment of the present invention.
Figure 7:
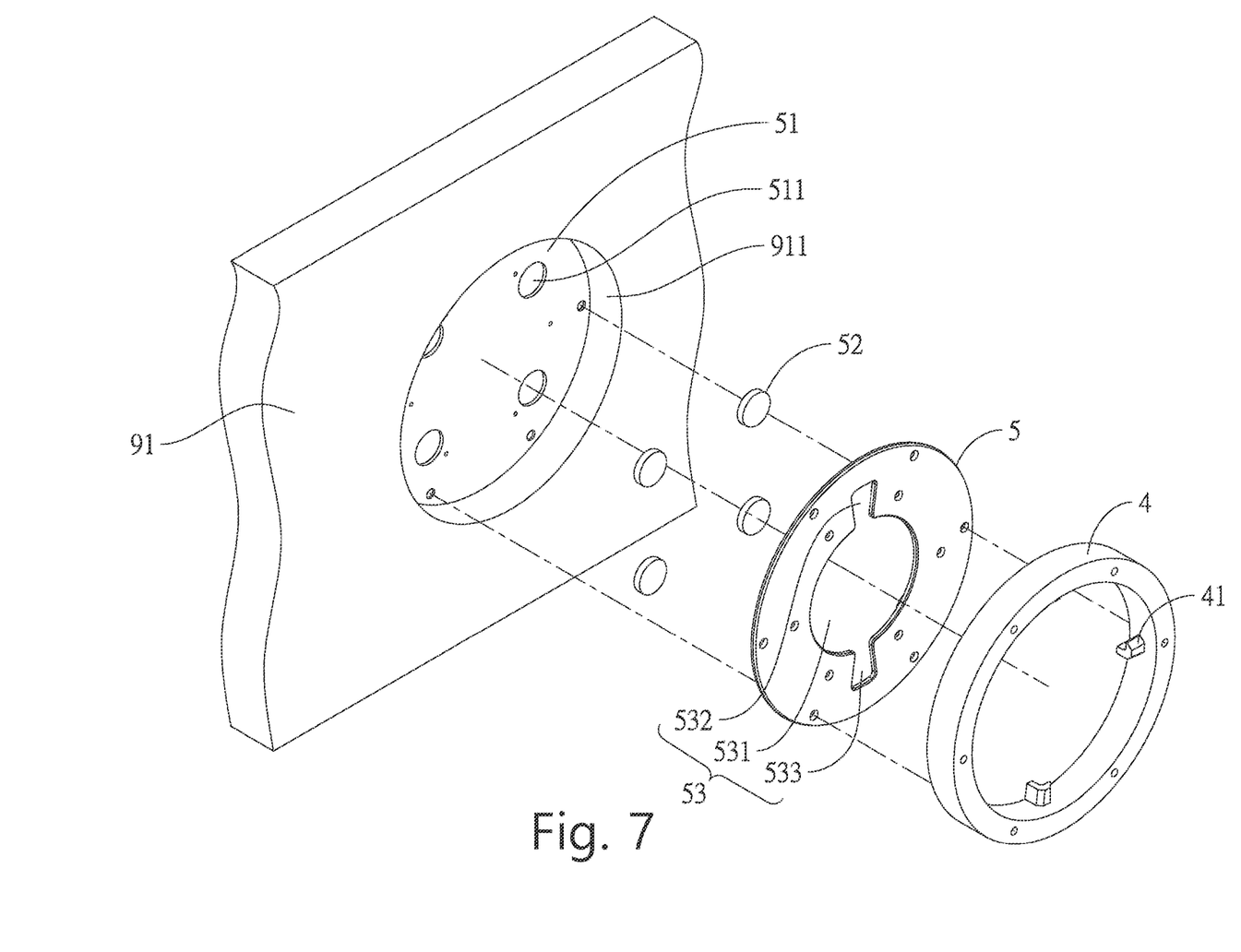
FIG. 7 is an exploded view showing some components and the display of the preferred embodiment of the present invention.
Figure 8:
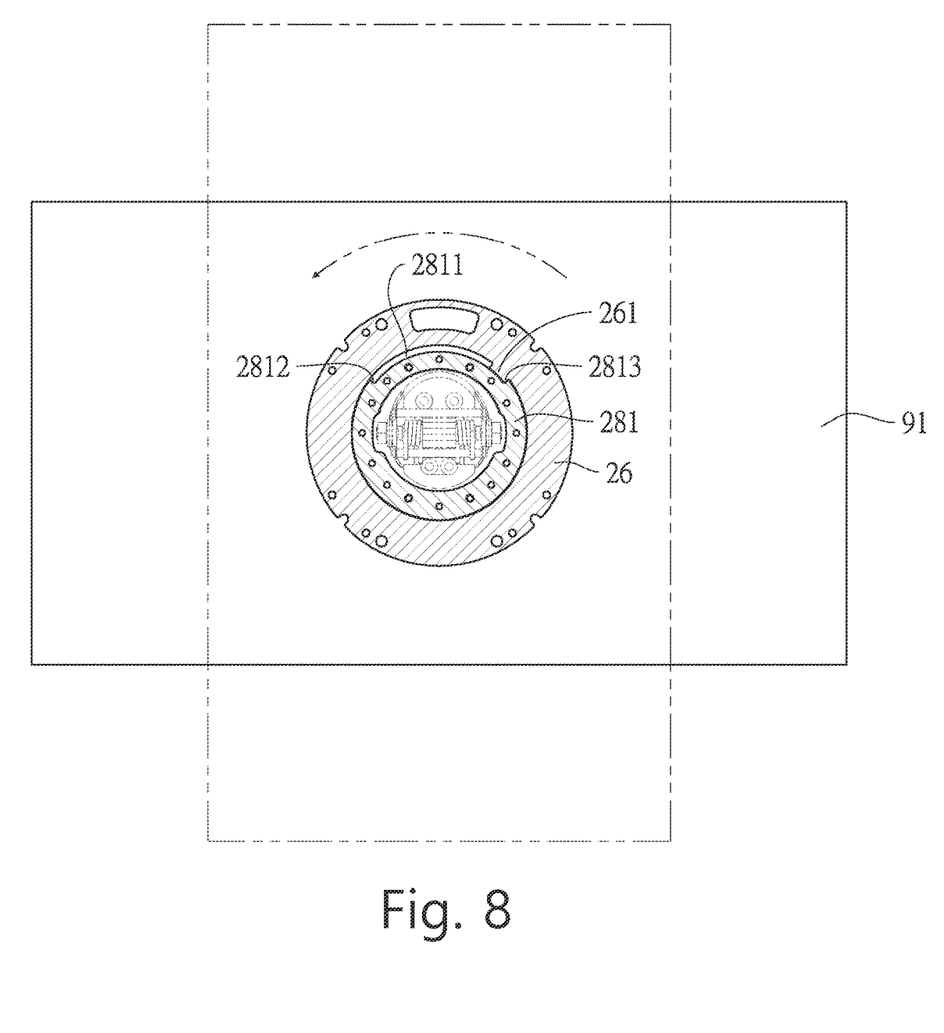
FIG. 8 is a schematic diagram showing the use state of the display of the preferred embodiment of the present invention when being rotated.

Please referring to FIGS. 1 and 2, the display quick-release structure 1 of the present invention includes a stand 2, a first buckle ring 3, and a second buckle ring 4. The stand 2 includes a top base 21 and a support frame 22. The top base 21 is connected with a side of a top end of the support frame 22, and a bottom end of the support frame 22 is provided on a bottom base 9. In implementation, the bottom end of the support frame 22 can also be inserted downward into a telescopic bracket or an adjustable support arm, or directly fixed on a desktop or equipment via a clamp. The second buckle ring 4 is fixed on the rear lateral surface of a display 91.

As shown in FIGS. 3-8, it is a preferred embodiment of the quick-release structure for a display 1 of the present invention, which includes a stand 2, a first buckle ring 3, and a second buckle ring 4. A top base 21 of the stand 2 includes a front cover 23, a rear cover 24, an adapter assembly 25, and a linkage member 26. The front cover 23 and the rear cover 24 cover oppositely each other. A clamping space 231 is formed between the front cover 23 and the rear cover 24.

The front cover 23 is in a shape of a disc, and an outer periphery of the front cover 23 has a plurality of notches 232 distributed in a form of an annular array, and the plurality of notches 232 is in communication with the clamping space 231. One lateral surface of the front cover 23 is provided with a plurality of second curved grooves 233 arranged in a form of an annular array for accommodating and positioning some of the plurality of elastic members 234 therein. One second limiting portion 235 is formed at each end of the plurality of second curved grooves 233 for limiting each end of the plurality of elastic members 234 respectively. One lateral surface of the front cover 23 is provided with a plurality of sectional round holes passed through the front cover 23, and the plurality of sectional round holes are arranged in a form of an annular array, and the sectional round holes are used as the first positioning groove 236. The plurality of first positioning grooves 236 respectively accommodates a plurality of first magnetic members 237. After the plurality of baffles 238 is respectively fixed on one lateral surface of the front cover 23, the plurality of first magnetic members 237 is respectively positioned in the plurality of the first positioning grooves 236. Another lateral surface of the front cover 23 has a first engaging portion 239, and the first engaging portion 239 protrudes outwardly in a direction away from another lateral surface. The first engaging portion 239 includes a circular plate-shaped first protrusion 2391 and two trapezoidal second protrusions (2392, 2393) respectively extending outwardly from opposite two ends of the first protrusion 2391. In addition, a curved perforation is provided on one lateral surface of the rear cover 24, and the curved perforation is used as the first limiting hole 241, and the first limiting hole 241 and the clamping space 231 are communicated with each other.

The adapter assembly 25 includes an adapter 27, a connecting assembly 28, and a hinge module 29. The adapter 27 is connected with the side of the top end of the support frame 22 in a liftable manner. The connecting assembly 28 includes a stop ring 281, a fixed plate set 282, and a limit plate set 283. An outer periphery of the disc-shaped stop ring 281 has a curved groove 2811, and two sides of the curved groove 2811 are respectively formed with a first stopping portion 2812 and a second stopping portion 2813. The fixed plate set 282 includes two symmetrical L-shaped bending plates (2821, 2822) for connecting two ends of the rotating shaft of the hinge module 29. The hinge module 29 is connected with the two bending plates (2821, 2822) of the connection assembly 28 and the adapter 27, such that the display 91 can be driven to be tilted and rotated. The fixed plate set 282 is locked to and connected with the limit plate set 283, and the stop ring 281 is clamped and connected between the fixed plate set 282 and the limit plate set 283. The linkage member 26 is an annular plate. The linkage member 26 is clamped and locked between the front cover 23 and the rear cover 24. The linkage member 26 is rotatably clamped between the fixed plate set 282 and the limit plate set 283. The inner ring surface of the linkage member 26 has a radially protruding pressing portion 261, and the plate surface of the linkage member 26 has a curved perforation, and the curved perforation is used as the second limiting hole 262. The linkage member 26 is sleeved on an outer periphery of the stop ring 281, and the pressing portion 261 is limited in the curved groove 2811 on an outer periphery of the stop ring 281, such that after the linkage member 26 is rotated, the pressing portion 261 is pressed against the first stopping portion 2812 or a second stopping portion 2813.

The first buckle ring 3 is accommodated and limited in the clamping space 231 between the front cover 23 and the rear cover 24. The first buckle ring 3 includes an annular buckle plate 31 and a plurality of elastic members 234. An outer ring surface of the annular buckle plate 31 is provided with a plurality of wedge-shaped blocks arranged in a form of an annular array and protruded forward, and the wedge-shaped blocks are used as the first buckling portions 311. There is a plurality of curved guiding blocks arranged in a form of an annular array on one lateral surface of the annular buckle plate 31. The curved guide blocks are correspondingly guided into the plurality of second curved grooves 233 to perform a stable guiding effect and to make the plurality of first buckle portions 311 moved back and forth in the plurality of notches 232. Each of the plurality of curved guiding blocks is recessed with a first curved groove 312 at for accommodating and positioning the other part of the plurality of elastic members 234 therein. One first limiting portion 313 is formed at each end of the plurality of first curved grooves 312 and the locations corresponding to the plurality of curved guiding blocks for respectively limiting another end of the plurality of elastic members 234. Another lateral surface of the annular buckle plate 31 has a pushing portion 314. The pushing portion 314 is sequentially passed through the second limiting hole 262 of the linkage member 26 and the first limiting hole 241 of the rear cover 24, and protruded at the outer side of the top base 21, such that the pushing portion 314 is pushed and then the first buckling ring 3 can be restored after being rotated, so as to have the plurality of first buckling portions 311 respectively hidden in the plurality of notches 232 of the front cover 23 to provide the protection.

The second buckle ring 4 is a circular collar, and the second buckle ring 4 is accommodated and connected in a circular groove 911 on the rear lateral surface of the display 91. The inner ring surface of the second buckle ring 4 has a plurality of wedge-shaped blocks arranged in a form of an annular array and protruding backward, and the wedge-shaped blocks are used as the second buckle portions 41. The plurality of second buckle portions 41 is corresponding to the plurality of first buckling portions 311 on the outer ring surface of the annular buckle plate 31. The inclined surface of the hook portion of each wedge-shaped block of the second buckle ring 4 is corresponding to the inclined surface of the hook portion of the wedge-shaped block of the first buckle ring 3, such that when the second magnetic member 52 of the display 91 is approached to the first magnetic member 237 of top base 21 of the stand 2, the magnetic attraction can be generated to make the second buckle ring 4 easy to be pressed, and the first buckle ring 3 is pushed away to form a buckling connection. A buckle plate 5, a positioning plate 51, and a plurality of second magnetic members 52 are provided between one side of the second buckle ring 4 and the rear lateral surface of the display 91, and the second buckle ring 4, the buckle plate 5, the plurality of second magnetic members 52 and the positioning plate 51 are sequentially accommodated and positioned in the circular groove 911.

The plate surface of the buckle plate 5 has a through hole that has the same shape as the first clamping portion 239, and the through hole is used with the second clamping portion 53. The second clamping portion 53 includes a circular first through hole 531 and two trapezoidal second through holes (532, 533) respectively extended outward from the opposite two ends of the first through hole 531. The positioning plate 51 is a circular plate, one lateral surface of the positioning plate 51 is close to the rear lateral surface of the display 91, and a plurality of through holes is provided on the plate surface of the positioning plate 51 to form a plurality of second positioning grooves 511 for respectively accommodating and positioning the plurality of second magnetic members 52, and the plurality of second magnetic members 52 is corresponding to the positions of the plurality of first magnetic members 237.

Accordingly, when the second clamping portion 53 of the clamping plate 5 is correspondingly connected with the first clamping portion 239 of the front cover 23, the plurality of first magnetic members 237 and the plurality of second magnetic members 52 can be allowed for mutual attraction and positioning, while allowing the plurality of second buckling portions 41 of the second buckling ring 4 to be respectively inserted into the plurality of notches 232 of the front cover 23, and each buckle portion 311 of the plurality of first buckling rings 3 is buckled and connected correspondingly and quickly, so as to connect the display 91 with the stand 2 accurately and quickly. When the user pushes the pushing portion 314 to toggle the first buckle ring 3, the plurality of elastic members 234 can be made to be in a compressed energy storage state to cancel the buckle function produced by the plurality of second buckling portions 41 and the plurality of first buckling portions 311, so as to allow the display 91 to be separated from the stand 2 after the display 91 is pulled. Since the plurality of first magnetic members 237 and the plurality of second magnetic members 52 are mutually attracted, the display 91 can also be can be prevented from falling off when be unlocked. In addition, when a user pushes the display 91 to cause the linkage member 26 together with the first buckle ring 3 to be rotated synchronously with the front cover 23 of the top seat 21 and the rear cover 24, the pressing portion 261 of the linkage member 26 presses the first stop portion 2812 or the second stop portion 2813 of the stop ring 281 respectively, such that the display 91 can be positioned in a vertical or horizontal position.

Based on the above structure, regarding the positioning structure of the present invention, not only can grooves and protrusions be provided on the corresponding circular surface to assist in confirming the positioning, but it also be able to use plural of magnetic members to form a positioning via multi-point mutual attraction, which not only helps in quick attracting and in respect to locating and corresponding hook-connection, but also effectively prevents the display from falling off when be unlocked. In terms of rotational positioning, the present invention can replace the conventional positioning structure with "two stop portions" to perform a stop action when the display is rotated vertically or horizontally, so as to prevent it from be tilted. Furthermore, the present invention arranges the "first buckling portion" and the "second buckling portion" at corresponding positions, which can facilitate the corresponding hook-connection. Moreover, combining the "first buckle portion" and the "pushing portion" together can facilitate their simultaneous actions, thereby allowing the quick-release structure of the present invention to be rotated synchronously with the display and to share the overall stress. In this way, the assembling and disassembling can be made more convenient and fast, and the "first buckling portion" is stored in the "housing of the top base of the stand" to protect the "first buckling portion" and the "second buckling portion" to avoid damage caused easily and abruptly to the devices of the present invention or brought injury to users.

The description and the drawings stated above are only for the preferred embodiments of the present invention. Many equivalent variations and modifications can still be made by those skilled in the field of the present invention and without departing from the spirit of the present invention, and thus they should be regarded to fall into the scope defined by the appended claims.

What is claimed is:

1. A quick-release structure for a display, comprising:
   a stand, including a top base and a support frame, the top base is connected with a side of a top end of the support frame, where the top base has a front cover and a rear cover that cover oppositely each other, a clamping space is provided between the front cover and the rear cover, the front cover has an outer periphery having a plurality of notches, the rear cover has one side having a first limiting hole, and the plurality of notches and the first limiting hole are respectively in communication with the clamping space;
   a first buckle ring, accommodated and limited in the clamping space in a manner that the first buckle ring can be restored after being rotated, where the first buckle ring has one side provided with a pushing portion, and the pushing portion is passed through the first limiting hole and protruded to be outside the top base, so as to push the first buckle ring to be rotated; the first buckle ring has one lateral surface having a plurality of first buckle portions; and
   a second buckle ring, connected with a back-lateral surface of a display, where the second buckle ring has a plurality of second buckle portions for being inserted into the plurality of notches of the front cover and respectively buckling the plurality of first buckle portions.

2. The quick-release structure for a display of claim 1, wherein the top base further includes an adapter assembly and a linkage member, the adapter assembly is connected with the side of the top end of the support frame, and the adapter assembly has a first stop portion and a second stop portion, and the linkage member is connected with the top base and clamped between the front cover and the rear cover; the linkage member has a pressing portion for be pressed against the first stop portion or the second stop portion after the linkage member is rotated synchronously with the top base and the display, so as to enable the display positioned in a vertical or horizontal position.

3. The quick-release structure for a display of claim 2, wherein the adapter assembly includes an adapter and a connection component, the adapter is connected with the side of the top end of the support frame, and the connection component has a stop ring, and the stop ring has the first stop portion and the second stop portion.

4. The quick-release structure for a display of claim 3, wherein the adapter assembly further includes a hinge module, and the hinge module is respectively connected with the connection component and the adapter for driving the display to be tilted upward and rotated.

5. The quick-release structure for a display of claim 4, wherein the connection component further includes a fixed plate set and a limiting plate set, the fixed plate set is connected with the hinge module, the fixed plate set and the limiting plate set are clamped and connected with the stop ring, and the linkage member is clamped rotatably between the fixed plate set and the limiting plate group.

6. The quick-release structure for a display of claim 5, wherein the stop ring has an outer periphery provided with a curved groove, and the curved groove has two sides respectively forming the first stop portion and the second stop portion; the linkage member is an annular plate, and the linkage member has an inner annular surface having the pressing portion protruding radially for being pressed against the first stop portion or the second stop portion.

7. The quick-release structure for a display of claim 1, wherein the first buckle ring includes a ring-shaped buckle plate and a plurality of elastic members, and the ring-shaped buckle plate has a plurality of first limiting portions arranged in a form of an annular array for respectively limiting one end of each elastic member; a plurality of second limiting portions arranged in a form of an annular array are provided on one lateral surface of the front cover for limiting another end of each elastic member respectively.

8. The quick-release structure for a display of claim 7, the ring-shaped buckle plate has one lateral surface provided with a plurality of first curved grooves arranged in a form of an annular array, each first curved groove has one end forming the first limiting portion, and the front cover has one lateral surface provided with a plurality of second curved grooves arranged in a form of an annular array, each second curved groove has one end forming the second limiting portion.

9. The quick-release structure for a display of claim 1, wherein the front cover has one lateral surface provided with a plurality of first positioning grooves for accommodating and positioning a plurality of first magnetic members; a plurality of second magnetic members are further provided between one side of the second buckle ring and the rear side of the display for correspondingly attracting the plurality of first magnetic members, and the rear side of the display is further provided with a plurality of second positioning grooves for accommodating and positioning the plurality of second magnetic members respectively.

10. The quick-release structure for a display of claim 9, wherein each first positioning groove is a sectional round hole formed on one lateral surface of the front cover; after the first magnetic member is accommodated in the sectional round hole, the first magnetic member is fixed and positioned on one lateral surface of the front cover with a baffle.

11. The quick-release structure for a display of claim 10, wherein the front cover further has another lateral surface provided with a first engaging portion, and an engaging plate is further provided between one side of the second buckling ring and the plurality of second magnetic members, and the engaging plate has a second engaging portion for engaging and positioning the first engaging portion.

12. The quick-release structure for a display of claim 11, wherein the first engaging portion includes a first protruding portion and two second protruding portions respectively extending outwardly from opposite ends of the first protruding portion; the second engaging portion includes a first perforation and two second perforations respectively extending outwardly from opposite ends of the first perforation.

13. The quick-release structure for a display of claim 9, wherein the front cover further has another lateral surface provided with a first engaging portion, and an engaging plate is further provided between one side of the second buckling ring and the plurality of second magnetic members, and the engaging plate has a second engaging portion for engaging and positioning the first engaging portion.

14. The quick-release structure for a display of claim 13, wherein the first engaging portion includes a first protruding portion and two second protruding portions respectively extending outwardly from opposite ends of the first protruding portion; the second engaging portion includes a first perforation and two second perforations respectively extending outwardly from opposite ends of the first perforation.

* * * * *